(12) United States Patent
Zhang et al.

(10) Patent No.: US 11,052,497 B2
(45) Date of Patent: Jul. 6, 2021

(54) METHOD AND SYSTEM FOR AUTOMATIC ASSEMBLY OF CURVED SURFACE PART

(71) Applicant: Northwestern Polytechnical University, Shaanxi (CN)

(72) Inventors: Kaifu Zhang, Shaanxi (CN); Yi Cheng, Shaanxi (CN); Hui Cheng, Shaanxi (CN); Bin Luo, Shaanxi (CN); Yuan Li, Shaanxi (CN)

(73) Assignee: Northwestern Polytechnical University, Shaanxi (CN)

( * ) Notice: Subject to any disclaimer, the term of this patent is extended or adjusted under 35 U.S.C. 154(b) by 417 days.

(21) Appl. No.: 16/096,088

(22) PCT Filed: Dec. 4, 2017

(86) PCT No.: PCT/CN2017/114445
§ 371 (c)(1),
(2) Date: Oct. 24, 2018

(87) PCT Pub. No.: WO2019/047393
PCT Pub. Date: Mar. 14, 2019

(65) Prior Publication Data
US 2020/0368859 A1    Nov. 26, 2020

(30) Foreign Application Priority Data

Sep. 5, 2017  (CN) .......................... 201710791969.9

(51) Int. Cl.
*B23P 19/04* (2006.01)
*B25J 9/16* (2006.01)
(Continued)

(52) U.S. Cl.
CPC ............. *B23P 19/04* (2013.01); *B25J 9/0084* (2013.01); *B25J 9/1682* (2013.01); *B25J 9/1684* (2013.01);
(Continued)

(58) Field of Classification Search
CPC ...... B23P 19/04; B25J 15/0019; B25J 11/005; B25J 9/1694; B25J 9/1684; B25J 19/022;
(Continued)

(56) References Cited

FOREIGN PATENT DOCUMENTS

| CN | 102430779 A | 5/2012 |
|----|-------------|--------|
| CN | 102768006 A | 11/2012 |

(Continued)

OTHER PUBLICATIONS

Gaoming, Ying, et. al., "Study on Normal Vector Measurement Method in Augo-drilling & Riveting of Aircraft Pane," Machine Tool & Hydraulics, Dec. 2010, vol. 38, No. 23, Northwestern Polytechnical University (5 Pages).

(Continued)

*Primary Examiner* — Jermie E Cozart
(74) *Attorney, Agent, or Firm* — Wood Herron & Evans LLP

(57) ABSTRACT

A method and system for automatic assembly of a curved surface part are provided. First, a space coordinate system is established, and a first unit normal vector of the space coordinate system is determined. Then, coordinates of three measurement points on the surface of a curved surface part in the space coordinate system are acquired; and a second unit normal vector to the surface of the curved surface part are determined according to the coordinates of the measurement points. Finally, a rotation angle of the end effector is calculated according to the first unit normal vector and the second unit normal vector; and the end effector is adjusted according to the rotation angle, such that a third unit normal vector of the end effector after adjustment coincides with the second unit normal vector. The method and system enhance the automatic assembly quality of the curved surface part.

10 Claims, 5 Drawing Sheets

(51) Int. Cl.
*B25J 11/00* (2006.01)
*B25J 19/02* (2006.01)
*B25J 15/00* (2006.01)
*B25J 9/00* (2006.01)

(52) U.S. Cl.
CPC ............ *B25J 11/005* (2013.01); *B25J 9/1694* (2013.01); *B25J 15/0019* (2013.01); *B25J 19/021* (2013.01); *B25J 19/022* (2013.01); *Y10T 29/4978* (2015.01); *Y10T 29/49769* (2015.01); *Y10T 29/49771* (2015.01)

(58) Field of Classification Search
CPC ................ B25J 19/021; Y10T 29/4978; Y10T 29/49771; Y10T 29/49769
See application file for complete search history.

(56) References Cited

FOREIGN PATENT DOCUMENTS

| | | | | |
|---|---|---|---|---|
| CN | 104759945 A | | 7/2015 | |
| CN | 104816307 A | | 8/2015 | |
| CN | 105222712 A | | 1/2016 | |
| JP | 10264060 A | * | 10/1998 | ......... B05B 13/0452 |
| JP | 2011159042 A | | 8/2011 | |

OTHER PUBLICATIONS

International Searching Authority, Search Report issued in International Application No. PCT/CN2017/114445 (5 pages).

* cited by examiner

METHOD AND SYSTEM FOR AUTOMATIC ASSEMBLY OF CURVED SURFACE PART

CROSS-REFERENCE TO RELATED APPLICATIONS

The present application is a national phase entry of, and claims priority to, International Application No. PCT/CN2017/114445, filed Dec. 4, 2017 which claims priority to Chinese Patent Application No. 201710791969.9, filed with the Chinese Patent Office on Sep. 5, 2017, both of which are incorporated herein by reference in their entireties.

TECHNICAL FIELD

The present invention relates to the field of digital assembly technologies, and in particular, to a method and system for automatic assembly of a curved surface part.

BACKGROUND

During automatic assembly of a curved surface part, an end effector is required to perform hole making, patching, and pin insertion in a normal to the curved surface part. Therefore, the posture of the end effector needs to be adjusted before assembly, to make the end effector vertical to the assembly point of curved surface part, which highly affects the assembly quality of the curved surface part and connection durability after the assembly. Most methods and processes for adjusting the posture of the end effector are based on four sensors at present. If one of the sensors malfunctions or fails to provide feedback in a program error, the end effector is unable to continue to work, such that the posture of the end effector cannot be adjusted on surfaces, and reducing the automatic assembly quality of the curved surface part.

Accordingly, it would be desirable to enhance the automatic assembly quality of the curved surface part in the field of the digital assembly technologies.

SUMMARY

An objective of the present invention is to provide a method and system for automatic assembly of a curved surface part, which can enhance automatic assembly quality of the curved surface part.

In one embodiment of the invention, a method for automatic assembly of a curved surface part is provided. The method includes: acquiring a central point of an execution end surface of an end effector; acquiring a sensor plane formed by at least three sensors distributed on the end effector; establishing a space coordinate system according to the central point and the sensor plane, where the origin of the space coordinate system is the central point, an X-Y plane of the space coordinate system is the sensor plane, an axis Z of the space coordinate system is a straight line on which a first unit normal vector is, the first unit normal vector being perpendicular to the X-Y plane at the origin; acquiring coordinates of three measurement points on the surface of a curved surface part in the space coordinate system, where the measurement points are intersections of the sensors and the surface of the curved surface part when the sensors collect information along a Z-axis direction; determining a curved surface expression of the surface of the curved surface part in the space coordinate system according to the coordinates of the measurement points; calculating a second unit normal vector to the surface of the curved surface part according to the curved surface expression; calculating a rotation angle of the end effector according to the first unit normal vector and the second unit normal vector; and adjusting the end effector according to the rotation angle, such that a third unit normal vector of the end effector coincides with the second unit normal vector.

In some embodiments, the step of acquiring coordinates of three measurement points on the surface of a curved surface part in the space coordinate system includes: acquiring right-angle sides $L_1$ and $L_2$ of a first right triangle, where the first right triangle is the sensor plane of which three vertexes are formed by the three sensors respectively, the central point is a middle point on the hypotenuse of the first right triangle, and the three sensors are a first sensor, a second sensor, and a third sensor respectively; acquiring coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

and the coordinates of the third sensor are $$\left(-\frac{L_1}{2}, -\frac{L_2}{2}, 0\right);$$

acquiring coordinates of a fourth sensing point according to the coordinates of the first sensor, the second sensor, and the third sensor, where the coordinates of the fourth sensing point are $$\left(-\frac{L_1}{2}, \frac{L_2}{2}, 0\right),$$

and the fourth sensing point is located at the right-angled vertex of a second right triangle; and the second right triangle and the first right triangle are identical in shape and their hypotenuses coincide, and the second right triangle and the first right triangle are combined into a rectangle; acquiring distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and calculating coordinates of the first measurement point, coordinates of the second measurement point, and coordinates of the third measurement point according to the space coordinate system and the distances $l_a$、$l_b$、$l_c$, where the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

In one aspect, the step of acquiring coordinates of three measurement points on the surface of a curved surface part in the space coordinate system further includes: acquiring the length $L_1$ and the width $L_2$ of a rectangle, where the rectangle is a sensor plane of which four vertexes are formed by four sensors respectively; the four sensors are a first sensor, a second sensor, a third sensor, and a fourth sensor respectively; and the fourth sensing point is set on the fourth sensor; acquiring coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

the coordinates of the third sensor are $$\left(-\frac{L_1}{2}, -\frac{L_2}{2}, 0\right),$$

and the coordinates of the fourth sensor are $$\left(-\frac{L_1}{2}, \frac{L_2}{2}, 0\right);$$

acquiring distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and calculating coordinates of the first measurement point, coordinates of the second measurement point, and coordinates of the third measurement point according to the space coordinate system and the distances $l_a 、 l_b 、 l_c$, where the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

In another aspect, the step of determining a curved surface expression of the surface of the curved surface part in the space coordinate system according to the coordinates of the measurement points specifically includes: calculating a distance $l_d$ from the fourth sensing point to a fourth measurement point according to the distances $l_a 、 l_b 、 l_c$, where the fourth measurement point is a measurement point on the surface of the curved surface part and corresponding to the fourth sensing point; calculating coordinates of the fourth measurement point according to the space coordinate system and the distances $l_d$, where the coordinates of the fourth measurement point are $$\left(-\frac{L_1}{2}, \frac{L_2}{2}, l_d\right);$$

determining a curved surface expression of the surface of the curved surface part in the space coordinate system according to the coordinates of the first measurement point, coordinates of the second measurement point, coordinates of the third measurement point, and coordinates of the fourth measurement point, where the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1. \quad (1)$$

In yet another aspect, the step of calculating a rotation angle of the end effector according to the first unit normal vector and the second unit normal vector specifically includes: determining that the third unit normal vector is parallel to the second unit normal vector according to that the third unit normal vector coincides with the second unit normal vector; determining a relational expression regarding the third unit normal vector and the second unit normal vector according to the mutually parallel third unit normal vector and second unit normal vector, where the relational expression is:

$$\begin{cases} \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{L_2} \cdot \frac{l_d - l_c}{l_b + l_d} = \sin\phi \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{L_1} \cdot \frac{l_c - l_b}{l_b + l_d} = -\frac{\cos\phi\tan\theta}{\sqrt{1 + \tan^2\theta}} \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{l_b + l_d} = \frac{\cos\phi}{\sqrt{1 + \tan^2\theta}} \end{cases}, \text{ where} \quad (2)$$

$\theta$ indicates a first rotation angle, and $\phi$ indicates a second rotation angle; and calculating the first rotation angle and the second rotation angle according to the relational expression, where the first rotation angle and the second rotation angle are respectively as follows:

$$\begin{cases} \theta = \tan^{-1}\left(\dfrac{l_c - l_b}{L_1}\right) \\ \phi = \sin^{-1}\left(\dfrac{2}{l_a + l_c} \cdot \sqrt{\left(\dfrac{l_a - l_b}{L_2}\right)^2 + \left(\dfrac{l_c - l_d}{L_1}\right)^2 + 1} \cdot \dfrac{2}{L_2} \cdot \dfrac{l_a - l_b}{l_a + l_c}\right) \end{cases} \quad (3)$$

In a further aspect, the step of determining a relational expression regarding the third unit normal vector and the second unit normal vector according to the mutually parallel third unit normal vector and second unit normal vector specifically includes: determining coordinates of the second unit normal vector according to the second unit normal vector, where the second unit normal vector is:

$$n = \dfrac{2}{l_b + l_d} \cdot \sqrt{\left(\dfrac{l_d - l_c}{L_2}\right)^2 + \left(\dfrac{l_c - l_d}{L_1}\right)^2 + 1} \cdot \left(\dfrac{2}{L_2} \cdot \dfrac{l_d - l_c}{l_b + l_d}, \dfrac{2}{L_1} \cdot \dfrac{l_c - l_b}{l_b + l_d}, \dfrac{2}{l_b + l_d}\right) \quad (4)$$

acquiring coordinates of the third unit normal vector; determining the relational expression regarding the third unit normal vector and the second unit normal vector according to the coordinates of the second unit normal vector, the coordinates of the third unit normal vector, and the mutually parallel third unit normal vector and second unit normal vector.

In yet another aspect, the step of acquiring coordinates of the third unit normal vector specifically includes: calculating, according to:

$$p \times p' = |p|^2 \cdot \sin\theta \cdot X \quad (5)$$

a normal vector p' obtained after the first unit normal vector rotates by an angle of θ about an axis X in the space coordinate system, where the normal vector p' is p'=(0,sinθ, cosθ), the first unit normal vector is p=(0,0,1), and X is a unit vector X=(1,0,0) on the axis X; calculating, according to the normal vector p', a unit vector Y' perpendicular to the normal vector p', where the unit vector Y' is Y'=(0, cosθ, sinθ); and calculating, according to:

$$p' \times p'' = |p''|^2 \cdot \sin\theta \cdot Y' \quad (6)$$

a normal vector p" obtained after the normal vector p' rotates by an angle of θ about the unit vector Y', where the normal vector P" is the third unit normal vector, and coordinates of the normal vector p" in the space coordinate system is:

$$p'' = \left(\sin\phi, -\dfrac{\cos\phi \tan\theta}{\sqrt{1 + \tan^2\theta}}, \dfrac{\cos\phi}{\sqrt{1 + \tan^2\theta}}\right).$$

In another embodiment, the present invention further provides a system for automatic assembly of a curved surface part, which includes: a central point acquisition module, configured to acquire a central point of an execution end surface of an end effector; a sensor plane acquisition module, configured to acquire a sensor plane formed by at least three sensors distributed on the end effector; a space coordinate system establishment module, configured to establish a space coordinate system according to the central point and the sensor plane, where the origin of the space coordinate system is the central point, an X-Y plane of the space coordinate system is the sensor plane, an axis Z of the space coordinate system is a straight line on which a first unit normal vector is, the first unit normal vector being perpendicular to the X-Y plane at the origin; a measurement point acquisition module, configured to acquire coordinates of three measurement points on the surface of a curved surface part in the space coordinate system, where the measurement points are intersections of the sensors and the surface of the curved surface part when the sensors collect information along a Z-axis direction; a curved surface expression determining module, configured to determine a curved surface expression of the surface of the curved surface part in the space coordinate system according to the coordinates of the measurement points; a second unit normal vector calculation module, configured to calculate a second unit normal vector to the surface of the curved surface part according to the curved surface expression; a rotation angle calculation module, configured to calculate a rotation angle of the end effector according to the first unit normal vector and the second unit normal vector; and an adjustment module, configured to adjust the end effector according to the rotation angle, such that a third unit normal vector of the end effector coincides with the second unit normal vector.

In one aspect, the measurement point acquisition module includes: a right-angle side acquisition unit, configured to acquire right-angle sides $L_1$ and $L_2$ of a first right triangle, where the first right triangle is the sensor plane of which three vertexes are formed by the three sensors respectively, the central point is a middle point on the hypotenuse of the first right triangle, and the three sensors are a first sensor, a second sensor, and a third sensor respectively; a sensor coordinate acquisition unit, configured to acquire coordinates of the sensors according to the space coordinate system, where the coordinates of the first sensor are $$\left(\dfrac{L_1}{2}, \dfrac{L_2}{2}, 0\right),$$

the coordinates of the second sensor are $$\left(\dfrac{L_1}{2}, -\dfrac{L_2}{2}, 0\right),$$

and the coordinates of the third sensor are $$\left(-\dfrac{L_1}{2}, -\dfrac{L_2}{2}, 0\right);$$

a fourth sensing point coordinate acquisition unit, configured to acquire coordinates of a fourth sensing point according to the coordinates of the first sensor, the second sensor, and the third sensor, where the coordinates of the fourth sensing point are $$\left(-\dfrac{L_1}{2}, \dfrac{L_2}{2}, 0\right),$$

and the fourth sensing point is located at the right-angled vertex of a second right triangle; and the second right triangle and the first right triangle are identical in shape and their hypotenuses coincide, and the second right triangle and the first right triangle are combined into a rectangle; a unit for acquiring distances from the sensors to the measurement points, configured to acquire distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and a measurement point coordinate calculation unit, configured to calculate coordinates of the first measurement point, coordinates of the second measurement point, and coordinates of the third measurement point according to the space coordinate system and the distances $l_a$、$l_b$、$l_c$, where the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

In another aspect, the curved surface expression determining module specifically includes: a unit for calculating a distance from the fourth sensing point to a fourth measurement point, configured to calculate a distance $l_d$ from the fourth sensing point to a fourth measurement point according to the distances $l_a$、$l_b$、$l_c$, where the fourth measurement point is a measurement point on the surface of the curved surface part and corresponding to the fourth sensing point; a fourth measurement point coordinate calculation unit, configured to calculate coordinates of the fourth measurement point according to the space coordinate system and the distances $l_d$, where the coordinates of the fourth measurement point are $$\left(-\frac{L_1}{2}, \frac{L_2}{2}, l_d\right);$$

and a curved surface expression determining unit, configured to determine a curved surface expression of the surface of the curved surface part in the space coordinate system according to the coordinates of the first measurement point, coordinates of the second measurement point, coordinates of the third measurement point, and coordinates of the fourth measurement point, where the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1 \quad (1)$$

According to the specific embodiments of the present invention, the present invention achieves the following technical advantages and effects. The present invention provides a method and system for automatic assembly of a curved surface part. First, a central point of an execution end surface of an end effector, and a sensor plane formed by at least three sensors distributed on the end effector are acquired; and a space coordinate system is established according to the central point and the sensor plane, where the origin of the space coordinate system is the central point, an X-Y plane of the space coordinate system is the sensor plane, an axis Z of the space coordinate system is a straight line on which a first unit normal vector is, the first unit normal vector being perpendicular to the X-Y plane at the origin. Then, coordinates of three measurement points on the surface of a curved surface part in the space coordinate system are acquired, where the measurement points are intersections of the sensors and the surface of the curved surface part when the sensors collect information along a Z-axis direction; a curved surface expression of the surface of the curved surface part in the space coordinate system is determined according to the coordinates of the measurement points; and a second unit normal vector to the surface of the curved surface part is further determined. Finally, a rotation angle of the end effector is calculated according to the first unit normal vector and the second unit normal vector; and the end effector is adjusted according to the rotation angle, such that a third unit normal vector of the end effector after adjustment coincides with the second unit normal vector. It can be seen from the above that, by using the method and system provided by the present invention, in order to adjust the posture of the end effector, it is only required to acquire coordinates of three measurement points on the surface of the curved surface part in the space coordinate system, thus overcoming the defect in the prior art that four sensors are necessarily required to adjust the posture of the end effector, and enhancing the automatic assembly quality and efficiency of the curved surface part.

In addition, rotation of the end effector about a normal vector p' after first adjustment refers to rotation about a unit vector Y' perpendicular to the normal vector p'. This case is fully considered during calculation of a rotation angle of the end effector. In this way, during second adjustment of the end effector, the adjustment is performed no longer according to the axis Y in the original space, and thus produces no deviation, thereby avoiding the problem that a normal vector of the end effector cannot coincide with that at an assembly point of the curved surface part. In this way, the automatic assembly quality and efficiency of the curved surface part are also enhanced.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Figure 1:
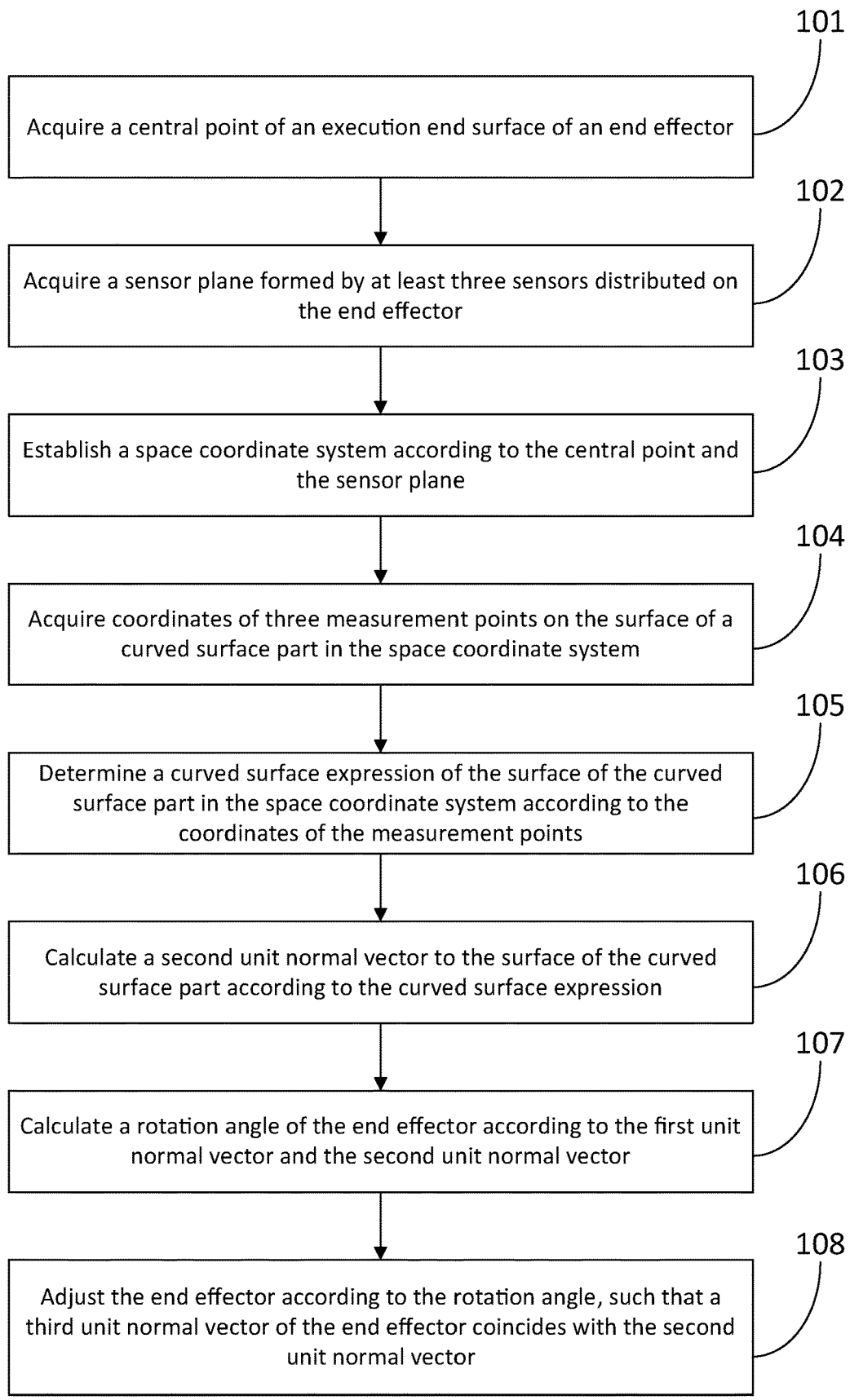
FIG. 1 is a schematic flowchart showing several steps of a method for automatic assembly of a curved surface part according to one embodiment of the invention.

Embodiments of the invention are illustrated below with reference to the accompanying drawings. The preferred embodiments described here are used only to describe and explain the present disclosure, but not to limit the present disclosure. All other embodiments obtained by a person of ordinary skill in the art based on the embodiments of the present invention without creative efforts shall fall within the protection scope of the present invention.

An objective of the present invention is to provide a method and system for automatic assembly of a curved surface part, which can enhance automatic assembly quality of the curved surface part.

To make the foregoing objective, features, and advantages of the present invention clearer and more comprehensible, the present invention is further described in detail below with reference to the accompanying drawings and several specific embodiments.

During automatic processing and assembly on the surface of a curved surface part, an end effector needs to perform hole making, patching, and pin insertion in a normal to the surface of the curved surface part. Therefore, the posture of the end effector needs to be adjusted before automatic processing on the surface of the curved surface part, such that a processing direction of the end effector coincides with the normal at an assembly point on the surface of the curved surface part. The accuracy at which the processing direction coincides with the normal at the assembly point highly affects the processing quality and connection durability after the assembly. Therefore, the automatic processing quality and efficiency of the curved surface part can be enhanced by improving the accuracy at which the processing direction coincides with the normal at the assembly point.

Currently, a sensor is mainly used to measure the normal to the surface of the curved surface part, and then normal-based leveling is performed by using a spatial geometry algorithm. However, the following problems commonly exist: It can be learned after measurement that, rotation axes corresponding to angular deviations of α and β are X and Y respectively; however, two axes in a coordinate system are already changed after first adjustment about the axis X by the angle of α. That is, the angle of β should correspond to an axis Y' in second adjustment, but the current method still makes an adjustment about the axis Y by the angle of β, resulting in a deviation in posture adjustment for the end effector. As a result, the processing direction of the end effector and the normal at the assembly point of the curved surface part cannot coincide, and the automatic assembly quality and efficiency of the curved surface part are reduced. Moreover, due to complexity (holes, protrusions, recesses, or the like) of a surface structure of the curved surface part, one of four sensors in the end effector may have no reading, such that automation equipment cannot continue to work.

In view of the foregoing problems, the present invention provides a method for automatically adjusting a processing direction of an end effector before an automatic assembly of a robot. Sensors are used to measure distances from the end effector to four measurement points on the surface of the curved surface part, and a processing direction of the end effector is adjusted based on distances to any three measurement points, such that the processing direction of the end effector coincides with a normal at an assembly point on the surface of the curved surface part, to ensure assembly efficiency and quality.

FIG. 1 is a schematic flowchart of a method for automatic assembly of a curved surface part according to an embodiment of the present invention. As shown in FIG. 1, the method for automatic assembly of a curved surface part provided by the present invention specifically includes the following steps:

Step 101: A central point of an execution end surface of an end effector is acquired.

Step 102: A sensor plane formed by at least three sensors distributed on the end effector is acquired.

Step 103: A space coordinate system is established according to the central point and the sensor plane. The origin of the space coordinate system is the central point, an X-Y plane of the space coordinate system is the sensor plane, an axis Z of the space coordinate system is a straight line on which a first unit normal vector is, the first unit normal vector being perpendicular to the X-Y plane at the origin.

Step 104: Coordinates of three measurement points on the surface of a curved surface part in the space coordinate system are acquired, where the measurement points are intersections of the sensors and the surface of the curved surface part when the sensors collect information along a Z-axis direction.

Step 105: A curved surface expression of the surface of the curved surface part in the space coordinate system is determined according to the coordinates of the measurement points.

Step 106: A second unit normal vector to the surface of the curved surface part is calculated according to the curved surface expression.

Step 107: A rotation angle of the end effector is calculated according to the first unit normal vector and the second unit normal vector.

Step 108: The end effector is adjusted according to the rotation angle, such that a third unit normal vector of the end effector coincides with the second unit normal vector.

Step 104 includes: acquiring right-angle sides $L_1$ and $L_2$ of a first right triangle, where the first right triangle is the sensor plane of which three vertexes are formed by the three sensors respectively, the central point is a middle point on the hypotenuse of the first right triangle, and the three sensors are a first sensor, a second sensor, and a third sensor respectively; acquiring coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

and the coordinates of the third sensor are $$\left(-\frac{L_1}{2}, -\frac{L_2}{2}, 0\right);$$

acquiring coordinates of a fourth sensing point according to the coordinates of the first sensor, the second sensor, and the third sensor, where the coordinates of the fourth sensing point in the space coordinate system are $$\left(-\frac{L}{2}, \frac{L_2}{2}, 0\right),$$

and the fourth sensing point is located at the right-angled vertex of a second right triangle; and the second right triangle and the first right triangle are identical in shape and their hypotenuses coincide, and the second right triangle and the first right triangle are combined into a rectangle; acquiring distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and calculating coordinates of the first measurement point, coordinates of the second measurement point, and coordinates of the third measurement point according to the space coordinate system and the distances $l_a$、$l_b$、$l_c$, where the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

Step 104 further includes: acquiring the length $L_1$ and the width $L_2$ of a rectangle, where the rectangle is a sensor plane of which four vertexes are formed by four sensors respectively; the four sensors are a first sensor, a second sensor, a third sensor, and a fourth sensor respectively; and the fourth sensing point is set on the fourth sensor; acquiring coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

the coordinates of the third sensor are $$\left(-\frac{L_1}{2}, -\frac{L_2}{2}, 0\right),$$

and the coordinates of the fourth sensor are $$\left(-\frac{L_1}{2}, \frac{L_2}{2}, 0\right);$$

acquiring distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and calculating coordinates of the first measurement point, the second measurement point, and the third measurement point in the space coordinate system according to the space coordinate system and the distances $l_a$、$l_b$、$l_c$, where the coordinates of the first measurement point, the second measurement point, and the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

Step 105 specifically includes: calculating a distance $l_d$ from the fourth sensing point to a fourth measurement point according to the distances $l_a$、$l_b$、$l_c$, where the fourth measurement point is a measurement point on the surface of the curved surface part and corresponding to the fourth sensing point; calculating coordinates of the fourth measurement point according to the space coordinate system and the distances $l_d$, where the coordinates of the fourth measurement point are $$\left(-\frac{L_1}{2}, \frac{L_2}{2}, l_d\right);$$

determining a curved surface expression of the surface of the curved surface part in the space coordinate system according to the coordinates of the first measurement point, coordinates of the second measurement point, coordinates of the third measurement point, and coordinates of the fourth measurement point, where the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1 \qquad (1)$$

Step 107 specifically includes the following sub-steps:

Step 1071: It is determined that the third unit normal vector is parallel to the second unit normal vector according to that the third unit normal vector coincides with the second unit normal vector.

Step 1072: A relational expression regarding the third unit normal vector and the second unit normal vector is determined according to the mutually parallel third unit normal vector and second unit normal vector. The relational expression is:

$$\begin{cases} \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{L_2} \cdot \frac{l_d - l_c}{l_b + l_d} = \sin\phi \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{L_1} \cdot \frac{l_c - l_b}{l_b + l_d} = -\frac{\cos\phi\tan\phi}{\sqrt{1 + \tan^2\theta}} \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{l_b + l_d} = \frac{\cos\phi}{\sqrt{1 + \tan^2\theta}} \end{cases} \qquad (2)$$

where $\theta$ indicates a first rotation angle, and φ indicates a second rotation angle.

The first rotation angle and the second rotation angle are calculated according to the relational expression. The first rotation angle and the second rotation angle are respectively as follows:

$$\begin{cases} \theta = \tan^{-1}\left(\dfrac{l_c - l_b}{L_1}\right) \\ \phi = \sin^{-1}\left(\dfrac{2}{l_a + l_c} \cdot \sqrt{\left(\dfrac{l_a - l_b}{L_2}\right)^2 + \left(\dfrac{l_c - l_d}{L_1}\right)^2 + 1} \cdot \dfrac{2}{L_2} \cdot \dfrac{l_a - l_b}{l_a + l_c}\right) \end{cases} \quad (3)$$

Step 1072 specifically includes: determining coordinates of the second unit normal vector according to the second unit normal vector, where the second unit normal vector is:

$$n = \dfrac{2}{l_b + l_d} \cdot \sqrt{\left(\dfrac{l_d - l_c}{L_2}\right)^2 + \left(\dfrac{l_c - l_d}{L_1}\right)^2 + 1} \cdot \quad (4)$$

$$\left(\dfrac{2}{L_2} \cdot \dfrac{l_d - l_c}{l_b + l_d}, \dfrac{2}{L_1} \cdot \dfrac{l_c - l_b}{l_b + l_d}, \dfrac{2}{l_b + l_d}\right)$$

acquiring coordinates of the third unit normal vector, which specifically includes: calculating, according to $$p \times p' = |p|^2 \cdot \sin\theta \cdot X \quad (5)$$

a normal vector θ obtained after the first unit normal vector rotates by an angle of p' about an axis X in the space coordinate system, where the normal vector p' is p'=(0,−sin θ,cos θ), the first unit normal vector is p=(0,0,1), and X is a unit vector X=(1,0,0) on the axis X; calculating, according to the normal vector p', a unit vector p' perpendicular to the normal vector Y', where the unit vector Y' is Y'=(0, cosθ, sinθ) ; and calculating, according to $$p' \times p'' = |p''|^2 \cdot \sin\theta \cdot Y' \quad (6),$$

a normal vector p'' obtained after the normal vector p' rotates by an angle of θ about the unit vector Y', where the normal vector p'' is the third unit normal vector, and coordinates of the normal vector p'' in the space coordinate system is $$p'' = \left(\sin\phi, -\dfrac{\cos\phi\tan\theta}{\sqrt{1 + \tan^2\theta}}, \dfrac{\cos\phi}{\sqrt{1 + \tan^2\theta}}\right);$$

and determining the relational expression regarding the third unit normal vector and the second unit normal vector according to the coordinates of the second unit normal vector, the coordinates of the third unit normal vector, and the mutually parallel third unit normal vector and second unit normal vector.

It can be seen from the above that, by using the method and system provided by the present invention, in order to adjust the posture of the end effector, it is only required to acquire coordinates of three measurement points on the surface of the curved surface part in the space coordinate system, thus overcoming the defect in the prior art that four sensors are necessarily required to adjust the posture of the end effector, and enhancing the automatic assembly quality and efficiency of the curved surface part.

In addition, rotation of the end effector about a normal vector p' after first adjustment refers to rotation about a unit vector Y' perpendicular to the normal vector p'. This case is fully considered during calculation of a rotation angle of the end effector. In this way, during second adjustment of the end effector, the adjustment is performed no longer according to the axis Y in the original space, and thus produces no deviation, thereby avoiding the problem that a normal vector of the end effector cannot coincide with that at an assembly point of the curved surface part. In this way, the automatic assembly quality and efficiency of the curved surface part are also enhanced.

Embodiment 2

The following provides a specific embodiment to describe the technical solutions of the present invention.

Figure 2:
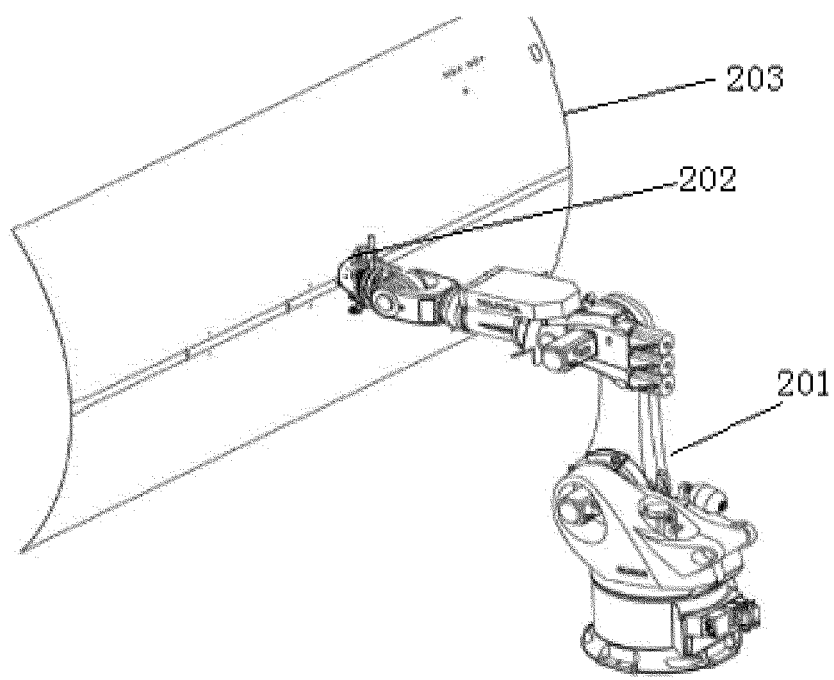
FIG. 2 is a perspective view of an application of hole making.

FIG. 2 is a schematic diagram of an existing application of hole making. A robot automatic hole making system is shown in FIG. 2, which includes a robot 201, an end effector 202, and a curved surface part 203. Four laser displacement sensors A, B, C, and D are mounted on the end effector 202, to form a laser displacement sensor system.

Figure 3:
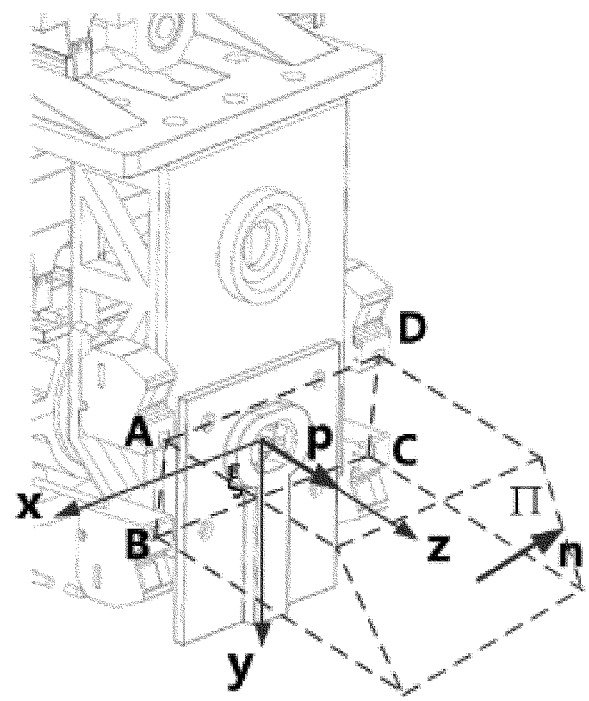
FIG. 3 is a perspective view showing measurement for an end effector according to one embodiment of the invention.

FIG. 3 is a schematic diagram showing measurement for an end effector according to an embodiment of the present invention. As shown in FIG. 3, the end effector 202 is driven by the robot 201 to reach a preset spatial position, and then the laser displacement sensors are turned on to measure a distance from the end effector to the surface of the curved surface part 203. Based on distance information collected by any three laser displacement sensors, a space coordinate system ξ in which the surface of the end effector 202 is located and a normal vector p to the surface are calculated; and a normal vector n, with respect to the space coordinate system ξ, to a plane Π in which a working point on the surface of the curved surface part 203 is located is further calculated. Then, by using a normal leveling algorithm based on a spatial vector, rotation is made in the space coordinate system ξ to turn p into p'', and when p'' is parallel to n, it indicates that leveling of the end effector in a processing direction is completed. The process includes the following steps:

Step 1: The laser displacement sensor system is calibrated and the space coordinate system ξ is established. Because calculation of an angular deviation of a laser displacement sensor coordinate system from the surface of the curved surface part involves the structure dimensions of the laser displacement sensor system and installation accuracy and error of the laser displacement sensors, it is required to calibrate relevant dimensions. Measurement centers of the four laser displacement sensors form a rectangular plane, and distances to the centers of the laser displacement sensors are accurately measured with a laser interferometer, to calibrate the length and width of the rectangle. The space coordinate system ξ is established at the center of the laser displacement sensor system and a normal vector p to the plane formed by the laser displacement sensors is calculated.

Step 2: Data is collected. After the robot drives a tool coordinate system (the space coordinate system to a target position according to an off-line program, the laser displacement sensors are turned on to collect, at a certain pulse frequency, data about distances from the laser displacement sensors to a panel on the surface of the curved surface part. A PLC is used to transmit voltage signals collected by the laser displacement sensors to a control system, and the control system converts the voltage values into displacement values, to obtain distances $l_a$, $l_b$, $l_c$, $l_d$ from the four laser displacement sensors to the panel on the surface of the curved surface part.

Step 3: An analytic equation regarding the plane H in which a working point on the surface of the curved surface part is located in the space coordinate system $\xi$, and the normal vector n to the plane are calculated. Three of the measurement results are selected. An area formed by three radiation points of the laser displacement sensor system on the surface of the curved surface part resembles a part plane, which is marked as the plane H in which the working point on the surface of the curved surface part is located. According to any three distances $l_a$, $l_b$, $l_c$, $l_d$ measured in step 2 and dimensions of the rectangle formed by the laser sensors, an analytic expression regarding the plane $\Pi$ in which the working point on the surface of the curved surface part is located in the space coordinate system $\xi$, and a normal vector n to the plane $\Pi$ are calculated.

Step 4: Spatial rotation angles $\theta$ and $\Phi$ are determined. By cross multiplication based on a spatial vector, the vector p is rotated by $\theta$ about a first axis (the axis X) of the tool coordinate system (the space coordinate system $\xi$), and then an obtained vector is rotated by $\Phi$ about a second axis (the axis Y') of the tool coordinate system (the space coordinate system $\xi$), such that the vector p is rotated to a position p". Finally, p" is made to be parallel to n, and an equation set is solved to obtain the angles $\theta$ and $\Phi$.

Step 5: A robot posture is adjusted. The robot is adjusted according to the calculated angles, such that a processing direction of the end effector coincides with a normal to the surface of the curved surface part.

The present invention applies to a hole making process on a part with a curved surface of a large curvature radius. By cooperation of the laser displacement sensors, robot, and control system, a processing direction of the end effector is made to coincide with a normal to the surface of the curved surface part. The following further describes in detail the embodiment of the present invention with reference to FIGS. 4 to 7, implementation manners, and implementation instances.

This method applies to a process before automatic hole making during assembly of an aircraft panel. Specific implementation steps are as follows: 1) Calibration of a sensor system and establishment of a space coordinate system $\xi$.

Figure 4:
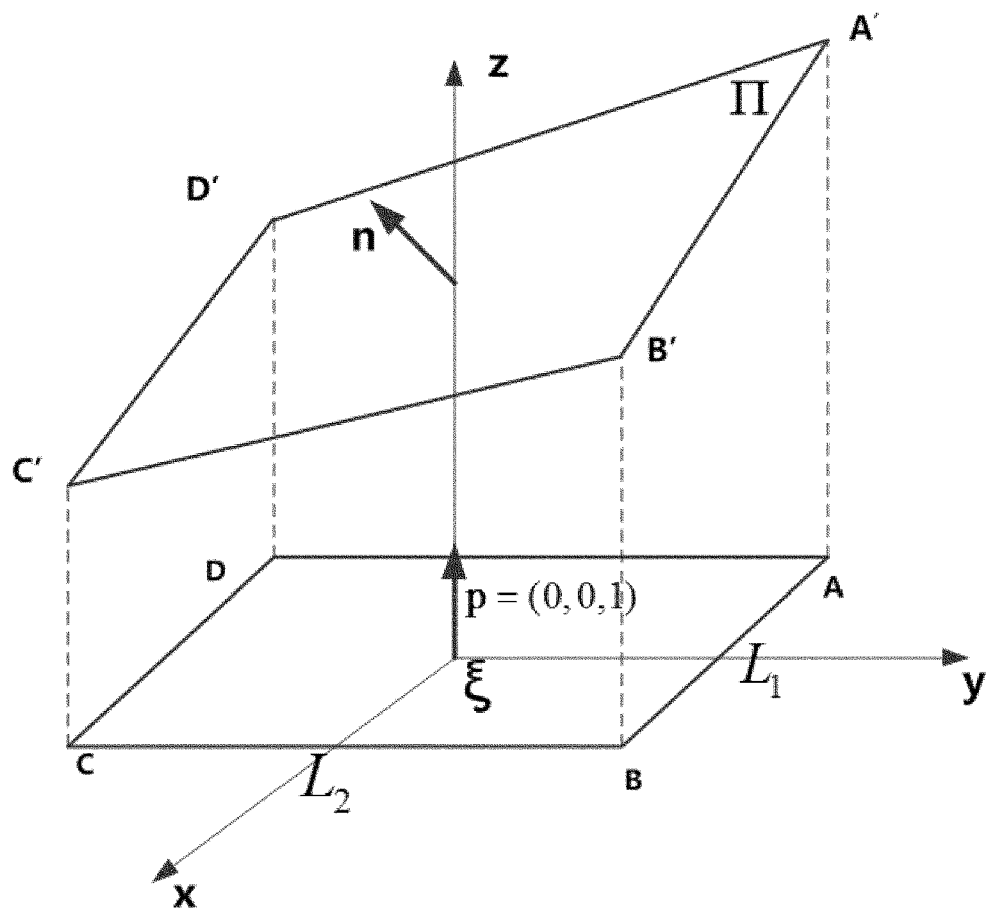
FIG. 4 is a schematic diagram of a laser displacement sensor system and a space coordinate system according to one embodiment of the invention.

FIG. 4 is a schematic diagram of a laser displacement sensor system and a space coordinate system according to an embodiment of the present invention. As shown in FIG. 4, centers of measuring heads of laser displacement sensors on an end effector are distributed on four angles of a rectangle respectively. The length and the width of the rectangle are accurately measured with a laser interferometer, and calibrated values are recorded as length $L_1$ and width $L_2$. A space coordinate system $\xi$ is established by using the center of the rectangle as the coordinate origin and a plane in which the rectangle is located as an X-Y plane. A normal vector p, with respect to the coordinate system, to the plane in which the rectangle is located can be further obtained, and p is used as a unit vector. Therefore, p=(0, 0, 1).

2) Data collection. After the robot drives a tool coordinate system (the space coordinate system $\xi$) to a target position according to an off-line program, the laser displacement sensors are turned on to collect, at a certain pulse frequency, data about distances from the laser displacement sensors to the panel. Assuming that a measurement range of the laser displacement sensor A is exceeded due to holes and openings on the panel, the laser displacement sensors B, C, and D acquire three voltage values $U_{Bx1}$, $U_{Cx1}$, and $U_{Dx1}$, and a control system converts the voltage values collected by the laser displacement sensors into corresponding displacement values $l_b$, $l_c$, and $l_d$.

3) Spatial position of the surface $\Pi$ of the panel and a normal vector to the surface.

In the space coordinate system $\xi$, three points on the surface of the panel are respectively $$B'\left(\frac{L_1}{2}, \frac{L_2}{2}, l_b\right), C'\left(\frac{L_1}{2}, -\frac{L_2}{2}, l_c\right), \text{ and } D'\left(-\frac{L_1}{2}, -\frac{L_2}{2}, l_d\right),$$

and a projection of the laser displacement sensor A on the plane B'C'D' is $$A'\left(-\frac{L_1}{2}, \frac{L_2}{2}, l_a\right).$$

As shown in FIG. 4, it can be easily known that:

$$AA' + CC' = BB' + DD' \quad (7)$$

that is: $\begin{cases} l_a + l_c = l_b + l_d \\ l_a = l_b + l_d - l_c \end{cases} \quad (8)$ Assuming that an analytic expression of the surface A'B'C'D' of the panel in the space is:

$$Ax+By+Cz=1 \quad (9)$$

it can be obtained by solving the expression that:

$$A = \frac{2}{L_2} \cdot \frac{l_d - l_c}{l_b + l_d},$$

$$B = \frac{2}{L_1} \cdot \frac{l_c - l_b}{l_b + l_d}, \text{ and}$$

$$C = \frac{2}{l_b + l_d};$$

and then an obtained expression is :

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1 \quad (1)$$

If the unit normal vector to the surface of the panel is recorded as n, $$n = \frac{2}{l_b + l_d} \cdot \sqrt{\left(\frac{l_d - l_c}{L_2}\right)^2 + \left(\frac{l_c - l_d}{L_1}\right)^2 + 1} \cdot \quad (4)$$

$$\left(\frac{2}{L_2} \cdot \frac{l_d - l_c}{l_b + l_d}, \frac{2}{L_1} \cdot \frac{l_c - l_b}{l_b + l_d}, \frac{2}{l_b + l_d}\right)$$

4) Rotation algorithm based on a spatial vector.

When a vector rotates about a vector of a particular point in the space, this motion can be resolved into two parts: a translational motion and a rotational motion. Because an angle of a vector changes only during rotation, the rotational motion is only considered in the rotation algorithm based on a spatial vector.

Figure 5:
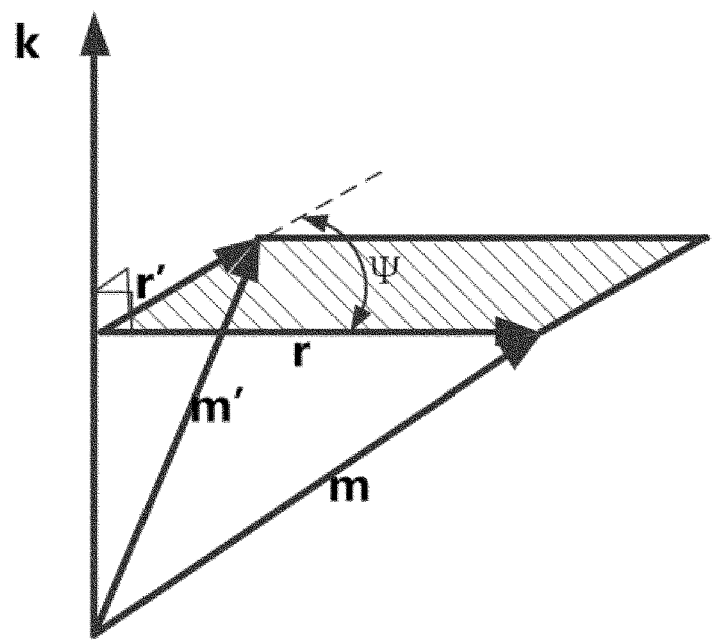
FIG. 5 is a schematic diagram of a working principle of a laser displacement sensor according to one embodiment of the invention.

FIG. 5 is a schematic diagram of a working principle of a laser displacement sensor according to an embodiment of the present invention. As shown in FIG. 5, it is assumed that two unit vectors k and m exist in a three-dimensional space, and the vector m is turned into a vector m' after rotating about the vector k by an angle of $\Psi$. First, the unit vectors k and m are translated to the same start point as an auxiliary vector r; r ⊥k, and vectors r and m have the same terminal point. In this way, rotation of m about k is turned into rotation of r about k. Then, r is rotated about k by $\Psi$ to obtain r'. The area of a parallelogram (a shaded region in the figure) with r and r' being adjacent sides is $|r|^2 \cdot \sin\Psi$. The following equation can be obtained through vector-based cross multiplication:

$$r \times r' = |r|^2 \cdot \sin\Psi \cdot k \quad (10)$$

Therefore, rotation in the three-dimensional space is converted into a vector-based cross multiplication operation, $r=(r_x, r_y, r_z)$, and $r'=(r'_x, r'_y, r'_z)$. A result can be obtained by using the following equation:

$$\begin{cases} \begin{vmatrix} i & j & k \\ r_x & r_y & r_z \\ r'_x & r'_y & r'_z \end{vmatrix} = (r_x^2 + r_y^2 + r_z^2) 1^2 \cdot \sin\Psi \cdot (k_x, k_y, k_z) \\ r_x^2 + r_y^2 + r_z^2 = r'^2_x + r'^2_y + r'^2_z \end{cases} \quad (11)$$

5) Calculation of a rotation angle of the end effector.

It can be known from steps 1) to 4) that, a normal vector to the surface of the panel is n, and a normal vector to the plane in which the end effector is located is p. It is assumed that p" is obtained after the vector p is rotated about a first axis of the tool coordinate system (the space coordinate system $\xi$) by $\theta$ and then rotated about a second axis by $\Phi$. Leveling of the end effector in the processing direction is completed if p"□n.

Figure 6:
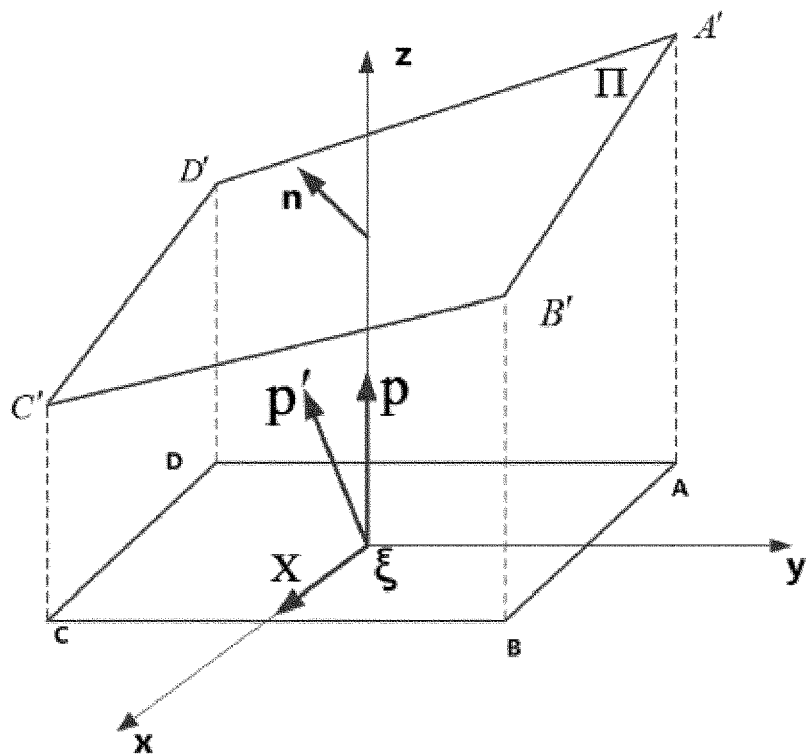
FIG. 6 is a schematic diagram of a ZOX plane of the end effector according to one embodiment of the invention.

FIG. 6 is a schematic diagram of a ZOX plane of the end effector according to an embodiment of the present invention. As shown in FIG. 6, according to the method in step 4), after the vector p=(0, 0, 1) is rotated about the first axis X=(1, 0, 0) of the tool coordinate system (the space coordinate system $\xi$) by $\theta$, $p'=(x_1, y_1, z_1)$ is obtained. Because p ⊥X, an auxiliary vector of p is still p, that is, $$p \times p' = |p|^2 \cdot \sin\theta \cdot X \quad (5)$$

and $$\begin{cases} \begin{vmatrix} i & j & k \\ 0 & 0 & 1 \\ x_1 & y_1 & z_1 \end{vmatrix} = 1^2 \cdot \sin\theta \cdot (1, 0, 0) \\ x_1^2 + y_1^2 + z_1^2 = 1 \end{cases} \quad (12)$$

The following result can be obtained:

$$\begin{cases} x_1 = 0 \\ y_1 = -\sin\theta \\ z_1 = \pm\cos\theta \end{cases} \quad (13)$$

where $z_1 = \cos\theta$ because the rotation angle is less than 90°.

Figure 7:
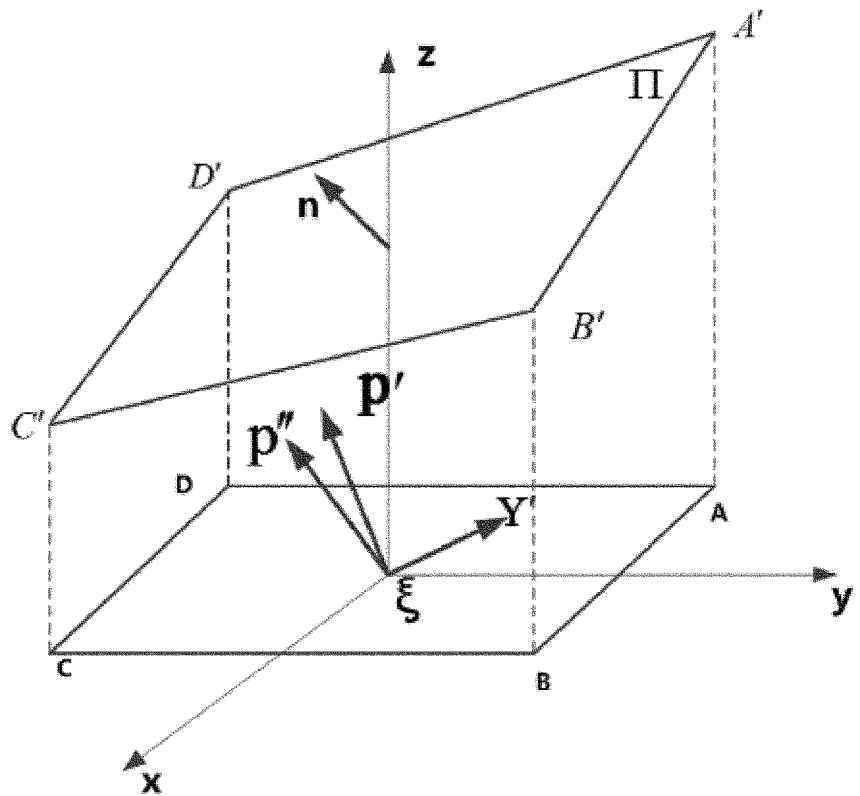
FIG. 7 is a schematic diagram of a ZOY plane of the end effector according to one embodiment of the invention.

FIG. 7 is a schematic diagram of a ZOY plane of the end effector according to an embodiment of the present invention. As shown in FIG. 7, according to the method in step 4), after the vector $p'=(0, -\sin\theta, \cos\theta)$ is rotated about the second axis $Y'=(0, \cos\theta, \sin\theta)$ of the tool coordinate system by $\Phi$, $p''=(x_2, y_2, z_2)$ is obtained. Because p'⊥Y', an auxiliary vector of p' is still p', that is, $$p' \times p'' = |p''|^2 \cdot \sin\Phi \cdot Y' \quad (6)$$

and $$\begin{cases} \begin{vmatrix} i & j & k \\ 0 & -\sin\theta & -\cos\theta \\ x_2 & y_2 & z_2 \end{vmatrix} = 1^2 \cdot \sin\phi \cdot (0, \cos\theta, \sin\theta) \\ x_2^2 + y_2^2 + z_2^2 = 1 \end{cases} \quad (14)$$

The following results can be obtained: $x_2 = \sin\phi$, $$y_2 = -\frac{\cos\phi\tan\theta}{\sqrt{1+\tan^2\theta}}, \text{ and } z_2 = \frac{\cos\phi}{\sqrt{1+\tan^2\theta}}.$$

The rotation angles $\theta$ and $\Phi$ are to be solved. When n ⁻ p, a processing direction of the end effector after adjustment coincides with the normal vector to the panel. Moreover, because n and p" are unit vectors, $$\begin{cases} \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{L_2} \cdot \frac{l_d-l_c}{l_b+l_d} = \sin\phi \\ \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{L_1} \cdot \frac{l_c-l_b}{l_b+l_d} = -\frac{\cos\phi\tan\theta}{\sqrt{1+\tan^2\theta}} \\ \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{l_b+l_d} = \frac{\cos\phi}{\sqrt{1+\tan^2\theta}} \end{cases} \quad (2)$$

The angles can be solved as follows:

$$\begin{cases} \theta = \tan^{-1}\left(\frac{l_c-l_b}{L_1}\right) \\ \phi = \sin^{-1}\left(\frac{2}{l_a+l_c} \cdot \sqrt{\left(\frac{l_a-l_b}{L_2}\right)^2 + \left(\frac{l_c-l_d}{L_1}\right)^2 + 1} \cdot \frac{2}{L_2} \cdot \frac{l_a-l_b}{l_a+l_c}\right) \end{cases} \quad (3)$$

6) Robot posture adjustment: In a current state, the end effector is rotated about the first axis of the tool coordinate system by an angle of $\theta$, and then rotated about the second axis by an angle of $\Phi$. In this case, a Z-axis direction of the tool coordinate system is a normal to a measured region of the curved surface.

7) A next-step hole making operation is performed after completion of the posture adjustment for the end effector.

In the embodiment of the present invention, by measuring a normal to a surface of a large-curvature part based on three points and by accurately adjusting an algorithm, a model error generated in an original algorithm due to an inaccurate mathematical model is eliminated. In the case where at least three sensors normally operate, an angle between the end effector and the surface of the part is calculated by analytical geometry, and through leveling steps and rotation by an angle, the end effector is made to be theoretically absolutely perpendicular to the surface of the part.

Embodiment 3

Figure 8:
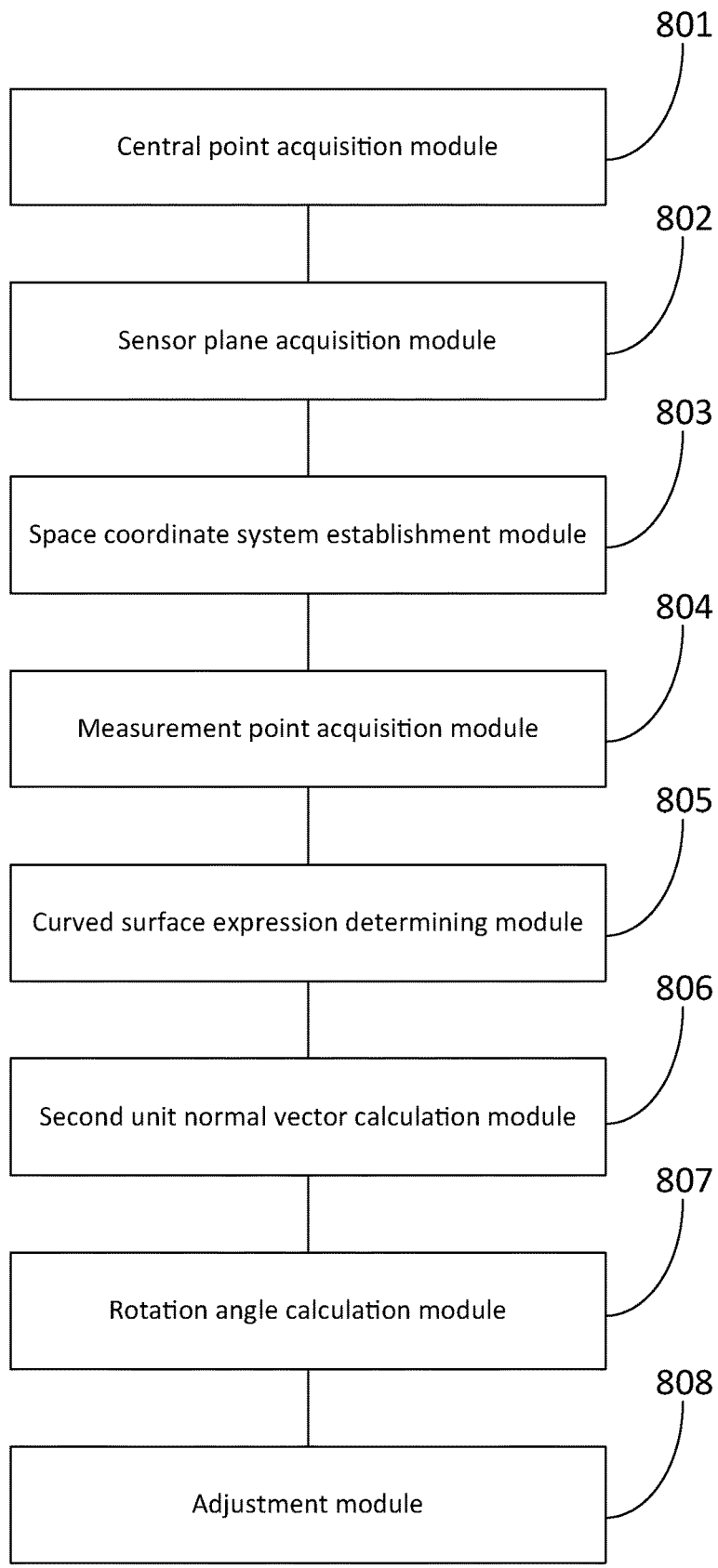
FIG. 8 is a schematic block diagram showing various components of a system for automatic assembly of a curved surface part according to another embodiment of the invention.

To achieve the foregoing objective, the present invention further provides a system for automatic assembly of a curved surface part. FIG. 8 is a schematic structural diagram of a system for automatic assembly of a curved surface part according to an embodiment of the present invention. As shown in FIG. 8, the system includes: a central point acquisition module 801, configured to acquire a central point of an execution end surface of an end effector; a sensor plane acquisition module 802, configured to acquire a sensor plane formed by at least three sensors distributed on the end effector; a space coordinate system establishment module 803, configured to establish a space coordinate system according to the central point and the sensor plane, where the origin of the space coordinate system is the central point, an X-Y plane of the space coordinate system is the sensor plane, an axis Z of the space coordinate system is a straight line on which a first unit normal vector is, the first unit normal vector being perpendicular to the X-Y plane at the origin; a measurement point acquisition module 804, configured to acquire coordinates of three measurement points on the surface of a curved surface part in the space coordinate system, where the measurement points are intersections of the sensors and the surface of the curved surface part when the sensors collect information along a Z-axis direction; a curved surface expression determining module 805, configured to determine a curved surface expression of the surface of the curved surface part in the space coordinate system according to the coordinates of the measurement points; a second unit normal vector calculation module 806, configured to calculate a second unit normal vector to the surface of the curved surface part according to the curved surface expression; a rotation angle calculation module 807, configured to calculate a rotation angle of the end effector according to the first unit normal vector and the second unit normal vector; and an adjustment module 808, configured to adjust the end effector according to the rotation angle, such that a third unit normal vector of the end effector coincides with the second unit normal vector.

The measurement point acquisition module 804 includes: a right-angle side acquisition unit, configured to acquire right-angle sides $L_1$ and $L_2$ of a first right triangle, where the first right triangle is the sensor plane of which three vertexes are formed by the three sensors respectively, the central point is a middle point on the hypotenuse of the first right triangle, and the three sensors are a first sensor, a second sensor, and a third sensor respectively; a sensor coordinate acquisition unit, configured to acquire coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

and the coordinates of the third sensor are $$\left(-\frac{L_1}{2}, -\frac{L_2}{2}, 0\right);$$

a fourth sensing point coordinate acquisition unit, configured to acquire coordinates of a fourth sensing point according to the coordinates of the first sensor, the second sensor, and the third sensor, where the coordinates of the fourth sensing point in the space coordinate system are $$\left(-\frac{L_1}{2}, \frac{L_2}{2}, 0\right),$$

and the fourth sensing point is located at the right-angled vertex of a second right triangle; and the second right triangle and the first right triangle are identical in shape and their hypotenuses coincide, and the second right triangle and the first right triangle are combined into a rectangle; a unit for acquiring distances from the sensors to the measurement points, configured to acquire distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and a measurement point coordinate calculation unit, configured to calculate coordinates of the first measurement point, coordinates of the second measurement point, and coordinates of the third measurement point according to the space coordinate system and the distances $l_a$、$l_b$、$l_c$, where the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

The measurement point acquisition module 804 further includes: a unit for acquiring the length and width of a rectangle, configured to acquire the length $L_1$ and the width $L_2$ of a rectangle, where the rectangle is a sensor plane of which four vertexes are formed by four sensors respectively; the four sensors are a first sensor, a second sensor, a third sensor, and a fourth sensor respectively; and the fourth sensing point is set on the fourth sensor; a sensor coordinate acquisition unit, configured to acquire coordinates of the sensors according to the space coordinate system, where the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

the coordinates of the third sensor are $$\left(-\frac{L_1}{2}, -\frac{L_2}{2}, 0\right),$$

and the coordinates of the fourth sensor are $$\left(-\frac{L_1}{2}, \frac{L_2}{2}, 0\right);$$

a unit for acquiring distances from the sensors to the measurement points, configured to acquire distances from the first sensor, the second sensor, and the third sensor to the measurement points respectively, where the measurement points include a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and a measurement point coordinate calculation unit, configured to calculate coordinates of the first measurement point, coordinates of the second measurement point, and coordinates of the third measurement point according to the space coordinate system and the distances $l_a$、$l_b$、$l_c$, where the coordinates of the first measurement point, coordinates of the second measurement point, and $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

coordinates of the third measurement point are respectively.

The curved surface expression determining module 805 specifically includes: a unit for calculating a distance from the fourth sensing point to a fourth measurement point, configured to calculate a distance $l_d$ from the fourth sensing point to a fourth measurement point according to the distances $l_a$、$l_b$、$l_c$, where the fourth measurement point is a measurement point on the surface of the curved surface part and corresponding to the fourth sensing point; a fourth measurement point coordinate calculation unit, configured to calculate coordinates of the fourth measurement point according to the space coordinate system and the distances $l_d$, where the coordinates of the fourth measurement point are $$\left(-\frac{L_1}{2}, \frac{L_2}{2}, l_d\right);$$

and a curved surface expression determining unit, configured to determine a curved surface expression of the surface of the curved surface part in the space coordinate system according to the coordinates of the first measurement point, coordinates of the second measurement point, coordinates of the third measurement point, and coordinates of the fourth measurement point, where the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1 \quad (1)$$

The rotation angle calculation module 807 specifically includes: a parallel relationship determining unit, configured to determine that the third unit normal vector is parallel to the second unit normal vector according to that the third unit normal vector coincides with the second unit normal vector; and a relational expression determining unit, configured to determine a relational expression regarding the third unit normal vector and the second unit normal vector according to the mutually parallel third unit normal vector and second unit normal vector, where the relational expression is:

$$\begin{cases} \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{L_2} \cdot \frac{l_d-l_c}{l_b+l_d} = \sin\phi \\ \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{L_1} \cdot \frac{l_c-l_b}{l_b+l_d} = -\frac{\cos\phi\tan\theta}{\sqrt{1+\tan^2\theta}} \\ \frac{2}{l_b+l_d} \cdot \sqrt{\left(\frac{l_d-l_c}{L_2}\right)^2 + \left(\frac{l_c-l_d}{L_1}\right)^2 + 1} \cdot \frac{2}{l_b+l_d} = \frac{\cos\phi}{\sqrt{1+\tan^2\theta}} \end{cases} \quad (2)$$

where $\theta$ indicates a first rotation angle, and $\phi$ indicates a second rotation angle.

The relational expression determining unit is further configured to: determine coordinates of the second unit normal vector according to the second unit normal vector, where the second unit normal vector is:

$$n = \frac{2}{l_b+l_d} \cdot \sqrt{\left(\frac{l_d-l_c}{L_2}\right)^2 + \left(\frac{l_c-l_d}{L_1}\right)^2 + 1} \cdot \left(\frac{2}{L_2} \cdot \frac{l_d-l_c}{l_b+l_d}, \frac{2}{L_1} \cdot \frac{l_c-l_b}{l_b+l_d}, \frac{2}{l_b+l_d}\right) \quad (4)$$

The acquiring coordinates of the third unit normal vector specifically includes: calculating, according to $p \times p' = |p|^2 \cdot \sin\theta \cdot X$ (5), a normal vector $\theta$ obtained after the first unit normal vector rotates by an angle of p' about an axis X in the space coordinate system, where the normal vector p' is p'=(0, −sinθ, cosθ), the first unit normal vector is p=(0, 0, 1), and X is a unit vector X=(1, 0, 0) on the axis X; calculating, according to the normal vector p', a unit vector p'pependicular to the the normal vector Y', where the unit vector Y'is Y'=(0, cosθ, sinθ); and calculating, according to $p' \times p'' = |p''|^2 \cdot \sin\Phi \cdot Y'$ (6), a normal vector p" obtained after the normal vector p' rotates by an angle of Φ about the unit vector Y', where the normal vector p" is the third unit normal vector, and coordinates of the normal vector p" in the space coordinate system is $$p'' = \left(\sin\phi, -\frac{\cos\phi\tan\theta}{\sqrt{1+\tan^2\theta}}, \frac{\cos\phi}{\sqrt{1+\tan^2\theta}}\right).$$

The relational expression determining unit is further configured to: determine the relational expression regarding the third unit normal vector and the second unit normal vector according to the coordinates of the second unit normal vector, the coordinates of the third unit normal vector, and the mutually parallel third unit normal vector and second unit normal vector.

The rotation angle calculation module further includes a rotation angle calculation unit, configured to calculate the first rotation angle and the second rotation angle according to the relational expression, where the first rotation angle and the second rotation angle are respectively as follows:

$$\begin{cases} \theta = \tan^{-1}\left(\frac{l_c-l_b}{L_1}\right) \\ \phi = \sin^{-1}\left(\frac{2}{l_a+l_c} \cdot \sqrt{\left(\frac{l_a-l_b}{L_2}\right)^2 + \left(\frac{l_c-l_d}{L_1}\right)^2 + 1} \cdot \frac{2}{L_2} \cdot \frac{l_a-l_b}{l_a+l_c}\right) \end{cases} \quad (3)$$

It can be seen from the above that, by using the system provided by the present invention, in order to adjust the posture of the end effector, it is only required to acquire coordinates of three measurement points on the surface of the curved surface part in the space coordinate system, thus overcoming the defect in the prior art that four sensors are necessarily required to adjust the posture of the end effector, and enhancing the automatic assembly quality of the curved surface part.

In addition, rotation of the end effector about a normal vector p' after first adjustment refers to rotation about a unit vector Y' perpendicular to the normal vector p'. This case is fully considered during calculation of a rotation angle of the end effector. In this way, during second adjustment of the end effector, the adjustment is performed no longer according to the axis Y in the original space, and thus produces no deviation, thereby avoiding the problem that a normal vector of the end effector cannot coincide with that at an assembly point of the curved surface part. In this way, the automatic assembly quality of the curved surface part is also enhanced.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A method for automatic assembly of a curved surface part, comprising:
    acquiring a central point of an execution end surface of an end effector;
    acquiring a sensor plane formed by at least three sensors distributed on the end effector;
    establishing a space coordinate system according to the central point and the sensor plane, wherein an origin of the space coordinate system is the central point, an x-y plane of the space coordinate system is the sensor plane, an axis z of the space coordinate system is a straight line on which a first unit normal vector is, the first unit normal vector being perpendicular to the x-y plane at the origin;
    acquiring coordinates of three measurement points on the surface of a curved surface part in the space coordinate system, wherein the measurement points are intersections of the sensors and the surface of the curved surface part when the sensors collect information along a z-axis direction;
    determining a curved surface expression of the surface of the curved surface part in the space coordinate system according to the coordinates of the measurement points;
    calculating a second unit normal vector to the surface of the curved surface part according to the curved surface expression;
    calculating a rotation angle of the end effector according to the first unit normal vector and the second unit normal vector; and
    adjusting the end effector according to the rotation angle, such that a third unit normal vector of the end effector coincides with the second unit normal vector.

2. The method according to claim 1, wherein the step of acquiring coordinates of three measurement points on the surface of a curved surface part in the space coordinate system comprises:
    acquiring right-angle sides $L_1$ and $L_2$ of a first right triangle, wherein the first right triangle is the sensor plane of which three vertexes are formed by the three sensors respectively, the central point is a middle point on a hypotenuse of the first right triangle, and the three sensors are a first sensor, a second sensor, and a third sensor respectively;
    acquiring coordinates of the sensors according to the space coordinate system, wherein the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

and the coordinates of the third sensor are $$\left(-\frac{L_1}{2}, -\frac{L_2}{2}, 0\right);$$

acquiring coordinates of a fourth sensing point according to the coordinates of the first sensor, the second sensor, and the third sensor, wherein the coordinates of the fourth sensing point are $$\left(-\frac{L_1}{2}, \frac{L_2}{2}, 0\right),$$

and the fourth sensing point is located at a right-angled vertex of a second right triangle; and the second right triangle and the first right triangle are identical in shape and their hypotenuses coincide, and the second right triangle and the first right triangle are combined into a rectangle;
    acquiring distances from the first sensor, the second sensor, and the third sensor to the measurement points respectively, wherein the measurement points comprise a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and
    calculating coordinates of the first measurement point, coordinates of the second measurement point, and coordinates of the third measurement point according to the space coordinate system and the distances $l_a$, $l_b$, $l_c$, wherein the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

3. The method according to claim 2, wherein the step of acquiring coordinates of three measurement points on the surface of a curved surface part in the space coordinate system further comprises:
acquiring a length $L_1$ and a width $L_2$ of a rectangle, wherein the rectangle is a sensor plane of which four vertexes are formed by four sensors respectively; the four sensors are a first sensor, a second sensor, a third sensor, and a fourth sensor respectively; and the fourth sensing point is set on the fourth sensor;
acquiring coordinates of the sensors according to the space coordinate system, wherein the coordinates of the first sensor are $$\left(\frac{L_1}{2}, \frac{L_2}{2}, 0\right),$$

the coordinates of the second sensor are $$\left(\frac{L_1}{2}, -\frac{L_2}{2}, 0\right),$$

the coordinates of the third sensor are $$\left(-\frac{L_1}{2}, -\frac{L_2}{2}, 0\right),$$

and the coordinates of the fourth sensor are $$\left(-\frac{L_1}{2}, \frac{L_2}{2}, 0\right);$$

acquiring distances from the first sensor, the second sensor, and the third sensor to the measurement points respectively, wherein the measurement points comprise a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and
calculating coordinates of the first measurement point, coordinates of the second measurement point, and coordinates of the third measurement point according to the space coordinate system and the distances $l_a$, $l_b$, $l_c$, wherein the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

4. The method according to claim 3, wherein the step of determining a curved surface expression of the surface of the curved surface part in the space coordinate system according to the coordinates of the measurement points comprises:
calculating a distance $l_a$, $l_b$, $l_c$ from the fourth sensing point to a fourth measurement point according to the distances $l_d$, wherein the fourth measurement point is a measurement point on the surface of the curved surface part and corresponding to the fourth sensing point;
calculating coordinates of the fourth measurement point according to the space coordinate system and the distances $l_d$, wherein the coordinates of the fourth measurement point are $$\left(-\frac{L_1}{2}, \frac{L_2}{2}, l_d\right);$$

determining a curved surface expression of the surface of the curved surface part in the space coordinate system according to the coordinates of the first measurement point, coordinates of the second measurement point, coordinates of the third measurement point, and coordinates of the fourth measurement point, wherein the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1.$$

5. The method according to claim 4, wherein the step of calculating a rotation angle of the end effector according to the first unit normal vector and the second unit normal vector comprises:
determining that the third unit normal vector is parallel to the second unit normal vector according to that the third unit normal vector coincides with the second unit normal vector;
determining a relational expression regarding the third unit normal vector and the second unit normal vector according to the mutually parallel third unit normal vector and second unit normal vector, where the relational expression is:

$$\begin{cases} \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{L_2} \cdot \frac{l_d - l_c}{l_b + l_d} = \sin\phi \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \\ \frac{2}{L_1} \cdot \frac{l_c - l_b}{l_b + l_d} = -\frac{\cos\phi \tan\theta}{\sqrt{1 + \tan^2\theta}} \\ \frac{2}{l_b + l_d} \cdot \sqrt{\left(\frac{l_d - l_c}{L_2}\right)^2 + \left(\frac{l_c - l_d}{L_1}\right)^2 + 1} \cdot \frac{2}{l_b + l_d} = \frac{\cos\phi}{\sqrt{1 + \tan^2\theta}} \end{cases}$$

wherein $\theta$ indicates a first rotation angle, and $\Phi$ indicates a second rotation angle;
calculating the first rotation angle and the second rotation angle according to the relational expression, wherein the first rotation angle and the second rotation angle are respectively as follows:

$$\begin{cases} \theta = \tan^{-1}\left(\dfrac{l_c - l_b}{L_1}\right) \\ \phi = \sin^{-1}\left(\dfrac{2}{l_a + l_c} \cdot \sqrt{\left(\dfrac{l_a - l_b}{L_2}\right)^2 + \left(\dfrac{l_c - l_d}{L_1}\right)^2 + 1} \cdot \dfrac{2}{L_2} \cdot \dfrac{l_a - l_b}{l_a + l_c}\right) \end{cases}$$

6. The method according to claim 5, wherein the step of determining a relational expression regarding the third unit normal vector and the second unit normal vector according to the mutually parallel third unit normal vector and second unit normal vector comprises:

determining coordinates of the second unit normal vector according to the second unit normal vector, wherein the second unit normal vector is:

$$n = \dfrac{2}{l_b + l_d} \cdot \sqrt{\left(\dfrac{l_d - l_c}{L_2}\right)^2 + \left(\dfrac{l_c - l_d}{L_1}\right)^2 + 1} \cdot \left(\dfrac{2}{L_2} \cdot \dfrac{l_d - l_c}{l_b + l_d}, \dfrac{2}{L_1} \cdot \dfrac{l_c - l_b}{l_b + l_d}, \dfrac{2}{l_b + l_d}\right) \quad (4)$$

acquiring coordinates of the third unit normal vector; and
determining the relational expression regarding the third unit normal vector and the second unit normal vector according to the coordinates of the second unit normal vector, the coordinates of the third unit normal vector, and the mutually parallel third unit normal vector and second unit normal vector.

7. The method according to claim 6, wherein the step of acquiring coordinates of the third unit normal vector comprises:

calculating, according to $p \times p' = |p|^2 \cdot \sin\theta \cdot X$, a normal vector $\theta$ obtained after the first unit normal vector rotates by an angle of $p'$ about an axis x in the space coordinate system, wherein the normal vector $p'$ is $p' = (0, -\sin\theta, \cos\theta)$, the first unit normal vector is $p = (0,0,1)$, and X is a unit vector $X = (1, 0, 0)$ on the axis x;

calculating, according to the normal vector $P'$, a unit vector $p'$ perpendicular to the normal vector $Y'$, where the unit vector $Y'$ is $Y' = (0, \cos\theta, \sin\theta)$; and calculating, according to $p' \times p'' = |p''|^2 \cdot \sin\Phi \cdot Y'$, a normal vector $p'$ obtained after the normal vector $Y'$ rotates by an angle of $\Phi$ about the unit vector $p''$, wherein the normal vector $p''$ is the third unit normal vector, and coordinates of the normal vector $p''$ in the space coordinate system is $$p'' = \left(\sin\phi, -\dfrac{\cos\phi\tan\theta}{\sqrt{1+\tan^2\theta}}, \dfrac{\cos\phi}{\sqrt{1+\tan^2\theta}}\right).$$

8. A system for automatic assembly of a curved surface part, comprising:

a central point acquisition module, configured to acquire a central point of an execution end surface of an end effector;

a sensor plane acquisition module, configured to acquire a sensor plane formed by at least three sensors distributed on the end effector;

a space coordinate system establishment module, configured to establish a space coordinate system according to the central point and the sensor plane, wherein an origin of the space coordinate system is the central point, an x-y plane of the space coordinate system is the sensor plane, an axis z of the space coordinate system is a straight line on which a first unit normal vector is, the first unit normal vector being perpendicular to the x-y plane at the origin;

a measurement point acquisition module, configured to acquire coordinates of three measurement points on the surface of a curved surface part in the space coordinate system, wherein the measurement points are intersections of the sensors and the surface of the curved surface part when the sensors collect information along a z-axis direction;

a curved surface expression determining module, configured to determine a curved surface expression of the surface of the curved surface part in the space coordinate system according to the coordinates of the measurement points;

a second unit normal vector calculation module, configured to calculate a second unit normal vector to the surface of the curved surface part according to the curved surface expression;

a rotation angle calculation module, configured to calculate a rotation angle of the end effector according to the first unit normal vector and the second unit normal vector; and an adjustment module, configured to adjust the end effector according to the rotation angle, such that a third unit normal vector of the end effector coincides with the second unit normal vector.

9. The system according to claim 8, wherein the measurement point acquisition module comprises:

a right-angle side acquisition unit, configured to acquire right-angle sides $L_1$ and $L_2$ of a first right triangle, wherein the first right triangle is the sensor plane of which three vertexes are formed by the three sensors respectively, the central point is a middle point on a hypotenuse of the first right triangle, and the three sensors are a first sensor, a second sensor, and a third sensor respectively;

a sensor coordinate acquisition unit, configured to acquire coordinates of the sensors according to the space coordinate system, wherein the coordinates of the first sensor are $$\left(\dfrac{L_1}{2}, \dfrac{L_2}{2}, 0\right),$$

the coordinates of the second sensor are $$\left(\dfrac{L_1}{2}, -\dfrac{L_2}{2}, 0\right),$$

and the coordinates of the third sensor are $$\left(-\dfrac{L_1}{2}, -\dfrac{L_2}{2}, 0\right);$$

a fourth sensing point coordinate acquisition unit, configured to acquire coordinates of a fourth sensing point according to the coordinates of the first sensor, the second sensor, and the third sensor, wherein the coordinates of the fourth sensing point are $$\left(-\frac{L_1}{2}, \frac{L_2}{2}, 0\right),$$

and the fourth sensing point is located at a right-angled vertex of a second right triangle; and the second right triangle and the first right triangle are identical in shape and their hypotenuses coincide, and the second right triangle and the first right triangle are combined into a rectangle;
- a unit for acquiring distances from the sensors to the measurement points, configured to acquire distances from the first sensor, the second sensor, and the third sensor to the measurement points respectively, wherein the measurement points comprise a first measurement point, a second measurement point, and a third measurement point; the distance from the first sensor to the first measurement point is $l_a$, the distance from the second sensor to the second measurement point is $l_b$, and the distance from the third sensor to the third measurement point is $l_c$; and
- a measurement point coordinate calculation unit, configured to calculate coordinates of the first measurement point, coordinates of the second measurement point, and coordinates of the third measurement point according to the space coordinate system and the distances $l_a$, $l_b$, $l_c$, wherein the coordinates of the first measurement point, coordinates of the second measurement point, and coordinates of the third measurement point are $$\left(\frac{L_1}{2}, \frac{L_2}{2}, l_a\right), \left(\frac{L_1}{2}, -\frac{L_2}{2}, l_b\right), \text{ and } \left(-\frac{L_1}{2}, -\frac{L_2}{2}, l_c\right)$$

respectively.

10. The system according to claim 9, wherein the curved surface expression determining module comprises:
- a unit for calculating a distance from the fourth sensing point to a fourth measurement point, configured to calculate a distance $l_a$, $l_b$, $l_c$ from the fourth sensing point to a fourth measurement point according to the distances $l_d$, wherein the fourth measurement point is a measurement point on the surface of the curved surface part and corresponding to the fourth sensing point;
- a fourth measurement point coordinate calculation unit, configured to calculate coordinates of the fourth measurement point according to the space coordinate system and the distances $l_d$, wherein the coordinates of the fourth measurement point are $$\left(-\frac{L_1}{2}, \frac{L_2}{2}, l_d\right);$$

and
- a curved surface expression determining unit, configured to determine a curved surface expression of the surface of the curved surface part in the space coordinate system according to the coordinates of the first measurement point, coordinates of the second measurement point, coordinates of the third measurement point, and coordinates of the fourth measurement point, where the curved surface expression is:

$$\frac{2}{L_2} \cdot \frac{l_d - l_c}{l_b + l_d} x + \frac{2}{L_1} \cdot \frac{l_c - l_b}{l_b + l_d} y + \frac{2}{l_b + l_d} z = 1.$$

* * * * *